United States Patent
Laturell et al.

(10) Patent No.: US 6,404,780 B1
(45) Date of Patent: Jun. 11, 2002

(54) SYNCHRONIZING DATA TRANSFER PROTOCOL ACROSS HIGH VOLTAGE INTERFACE

(75) Inventors: Donald Raymond Laturell, Allentown; Lane A. Smith, Easton; Tony S. El-kik, Allentown, all of PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/219,775

(22) Filed: Dec. 23, 1998

(51) Int. Cl.[7] .................................................. H04J 3/06
(52) U.S. Cl. ...................... 370/510; 370/514; 370/498; 375/365
(58) Field of Search ................................. 370/509, 514, 370/503, 510, 511–515; 375/368–370, 363–365

(56) References Cited

U.S. PATENT DOCUMENTS

| | | | | |
|---|---|---|---|---|
| 4,049,917 A | * | 9/1977 | Copperi et al. | 179/15 AP |
| 5,694,428 A | * | 12/1997 | Campana, Jr. | 375/260 |
| 5,870,046 A | * | 2/1999 | Scott et al. | 341/143 |
| 6,111,924 A | * | 8/2000 | McKinley | 375/354 |
| 6,263,075 B1 | * | 7/2001 | Fadavi-Ardekani et al. | 379/399 |
| 6,356,555 B1 | * | 3/2002 | Rakib et al. | 370/441 |

OTHER PUBLICATIONS

Analog Devices et al., "Audio Codec '97; Component Specification; Revision 1.03; Sep. 15, 1996", Sep. 15, 1997.

Intel Corporation, "Audio Codec '97; Revision 2.0, Sep. 29, 1997".

* cited by examiner

Primary Examiner—Ricky Ngo
Assistant Examiner—Tri Phan
(74) Attorney, Agent, or Firm—William H. Bollman (57) ABSTRACT

The present invention provides a synchronizing data protocol comprising one or more serial input-output (SIO) control word(s) and data passed across a high voltage interface, to allow the elimination of a frame synchronization signal (and corresponding AC coupling capacitors). The present invention has particular applicability to, e.g., time division multiplexed (TDM) data, serial data communication devices, or synchronous serial communication interfaces in general, and to the communication between a controller and a codec in an audio codec device in accordance with the AC '97 Specification, i.e., the AC Link. The synchronizing data protocol is implemented over a transmit data signal line to provide occasional synchronization (i.e., not frame-by-frame synchronization) between the two communicating devices. The master device includes a preamble insertion module to insert a predetermined preamble code word into the transmitted data stream. An interrupt is sent to the slave device by withholding the data clock signal for a predetermined amount of time. Upon receipt of the interrupt, the slave device monitors the data stream for the presence of the preamble code word. Upon detection of the preamble code word, data transmitted by the codec is again enabled.

17 Claims, 7 Drawing Sheets

FIG. 5
PRIOR ART
AC-LINK AUDIO OUTPUT FRAME

SYNCHRONIZING DATA TRANSFER PROTOCOL ACROSS HIGH VOLTAGE INTERFACE

BACKGROUND OF THE INVENTION

1. Field of the Invention

This invention relates to an improved serial interface. More particularly, it relates to the elimination of a synchronization signal such as a frame sync signal in a synchronized serial data stream or a time division multiplex serial data stream by replacement with a synchronizing data protocol.

2. Background of Related Art

Serial communications are an effective method of communicating between two digital components, particularly in cost sensitive applications to minimize the hardware requirements otherwise required for parallel communications. For instance, a serial interface technique implementing a transmit line, receive line, data clock line, and a frame synchronizing line (and a reset line) has been implemented in conventional multipurpose codecs.

A codec is a device which for many years has allowed efficient and inexpensive digitization of telephone grade audio. The typical codec (short for COder-DECoder) is an integrated circuit or other electronic device which combines the circuits needed to convert analog signals to and from digital signals, e.g., Pulse Code Modulation (PCM) digital signals.

Early codecs converted analog signals at an 8 KHz rate into 8-bit PCM for use in telephony, and were not capable of handling modem inputs. More recently, the efficiency and low cost advantages of codecs have been expanded to convert analog signals at a 48 KHz sampling rate into 16-bit stereo (and even up to 20-bit stereo) for higher quality use beyond that required for telephony. With higher quality and broader bandwidth capability, today's codecs find practical application with consumer equipment such as voice band modems.

With the development of codecs for these more sophisticated purposes came the need to improve the analog signal-to-noise (S/N) ratio to at least 75 to 90 dB. One major step toward achieving this high S/N ratio was accomplished more recently by separating the conventional codec into two individual sub-systems: a controller sub-system or integrated circuit (IC) handling primarily the digital interface to a host processor, and an analog sub-system or IC handling primarily the interface to, mixing and conversion of analog signals. This split digital/analog architecture has been documented most recently as the "Audio Codec '97 Component Specification", Revision 1.03, Sep. 15, 1996 ("the AC '97 Specification"). The AC '97 Specification in its entirety is expressly incorporated herein by reference.

Figure 3:
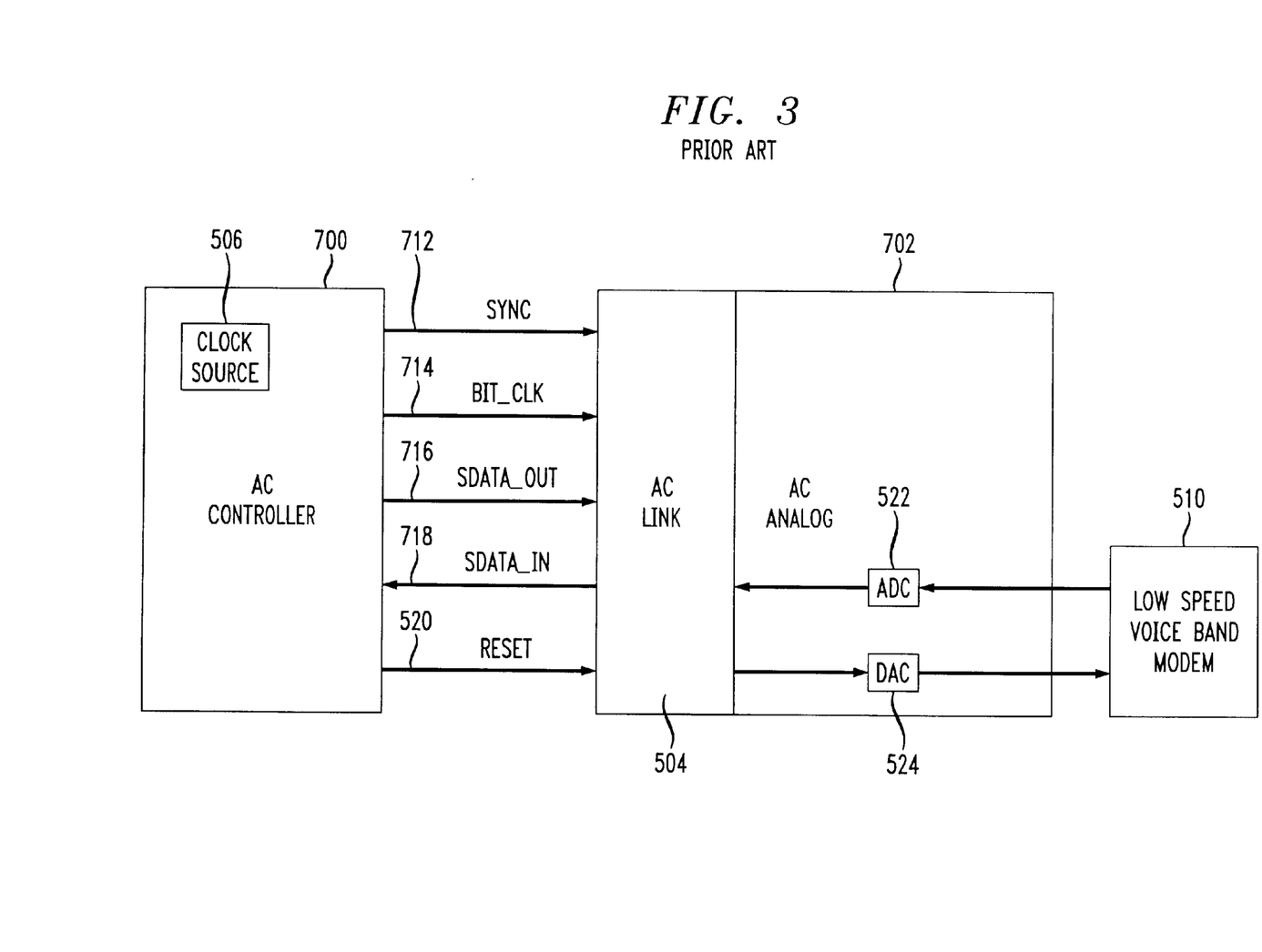
FIG. 3 shows a conventional four signal (plus reset) serial interface between two separate circuits in accordance with the AC '97 Specification.

FIG. 3 shows a conventional split-architecture audio codec interfacing to a device such as a low speed voice band modem 510 in accordance with the AC '97 Specification.

In particular, in FIG. 3, an AC controller sub-system 700 interfaces to an AC analog sub-system 702 via a five-wire synchronized serial data bus (i.e., a time division multiplexed (TDM) bus) referred to as the AC link 504. The five-wire TDM bus of the AC link 504 comprises a sync signal 712, a reset signal 520, a serial TDM data stream SDATA_OUT 716 from the AC controller sub-system 700 to the AC analog sub-system 702, a clock signal BIT_CLK 714, and a serial TDM data stream SDATA_IN 718 from the AC analog sub-system 702 to the AC controller 700. The clock signal BIT_CLK 714 is derived by a clock source 506 in or relating to the controller 700.

The circuitry in the conventional AC analog sub-system 702 which interfaces to an external analog device such as the low-speed voice band modem includes an analog-to-digital converter (ADC) 522 and a digital-to-analog converter (DAC) 524. The ADC 522 samples the analog modem signal input to the AC analog sub-system 702 and provides 16-, 18- or 20-bit data at 48 Ks/s to the AC link 504 for insertion into an appropriate time slot (e.g., time slot 5) of the serial TDM data stream SDATA_IN 718 input to the AC controller sub-system 700. Conversely, the DAC 524 receives 16-, 18- or 20-bit data from the serial TDM data stream SDATA_OUT 716 from the AC controller sub-system 700 of the AC link 504 and converts the same into an analog signal output to the low-speed voice band modem 510. Conventional demodulation and modulation techniques such as quadrature amplitude modulation (QAM) or Carrierless Amplitude and Phase (CAP) may be performed by a digital signal processor (DSP) and/or other processor in conjunction with the ADC 522 and/or DAC 524.

Figure 4:
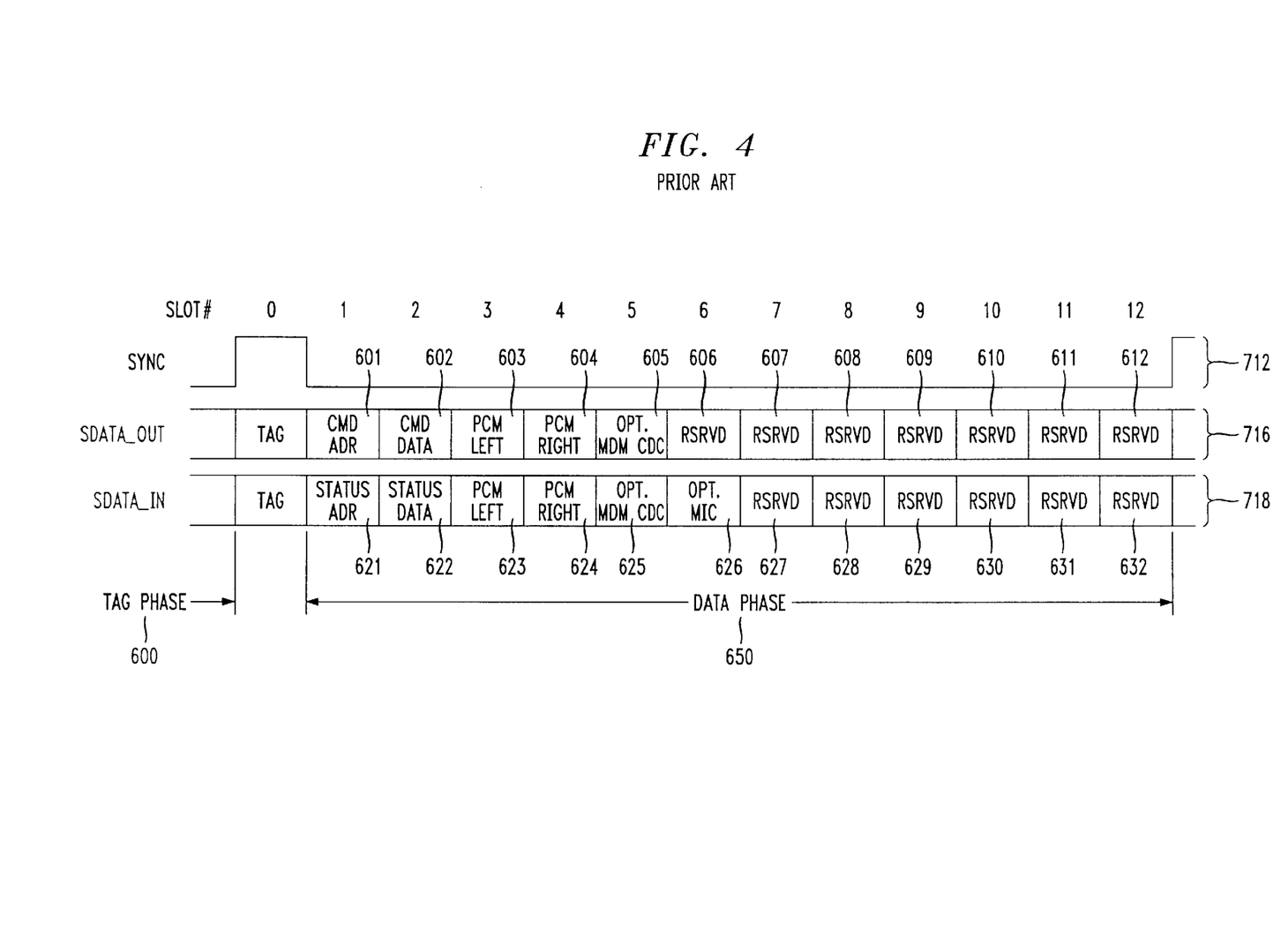
FIG. 4 depicts a conventional sync signal, and twelve slot, serial TDM transmit and receive data streams between the analog and controller sub-systems of a split-architecture audio codec such as is shown in FIG. 3.

FIG. 4 depicts a conventional sync signal 712, serial TDM data stream SDATA OUT 716, and serial TDM data stream SDATA IN 718, in a twelve slot TDM bi-directional data stream between the analog and controller sub-systems 702, 700 of a split-architecture audio codec such as in accordance with the AC '97 Specification. The twelve time slots 1 to 12 of the serial TDM data streams SDATA_OUT 716 and SDATA_IN 718 are framed by the conventional sync signal 712. The sync signal 712 is derived from a TAG Phase 600 received during time slot 0. All time slots are 20 bits wide.

The sync signal 712 synchronizes the reception and transmission of the SDATA_OUT 716 and SDATA_IN 718 with respect to clock signal BIT_CLK 714. This synchronization between the data lines and the clock signal is shown in more detail in FIG. 5.

Figure 5:
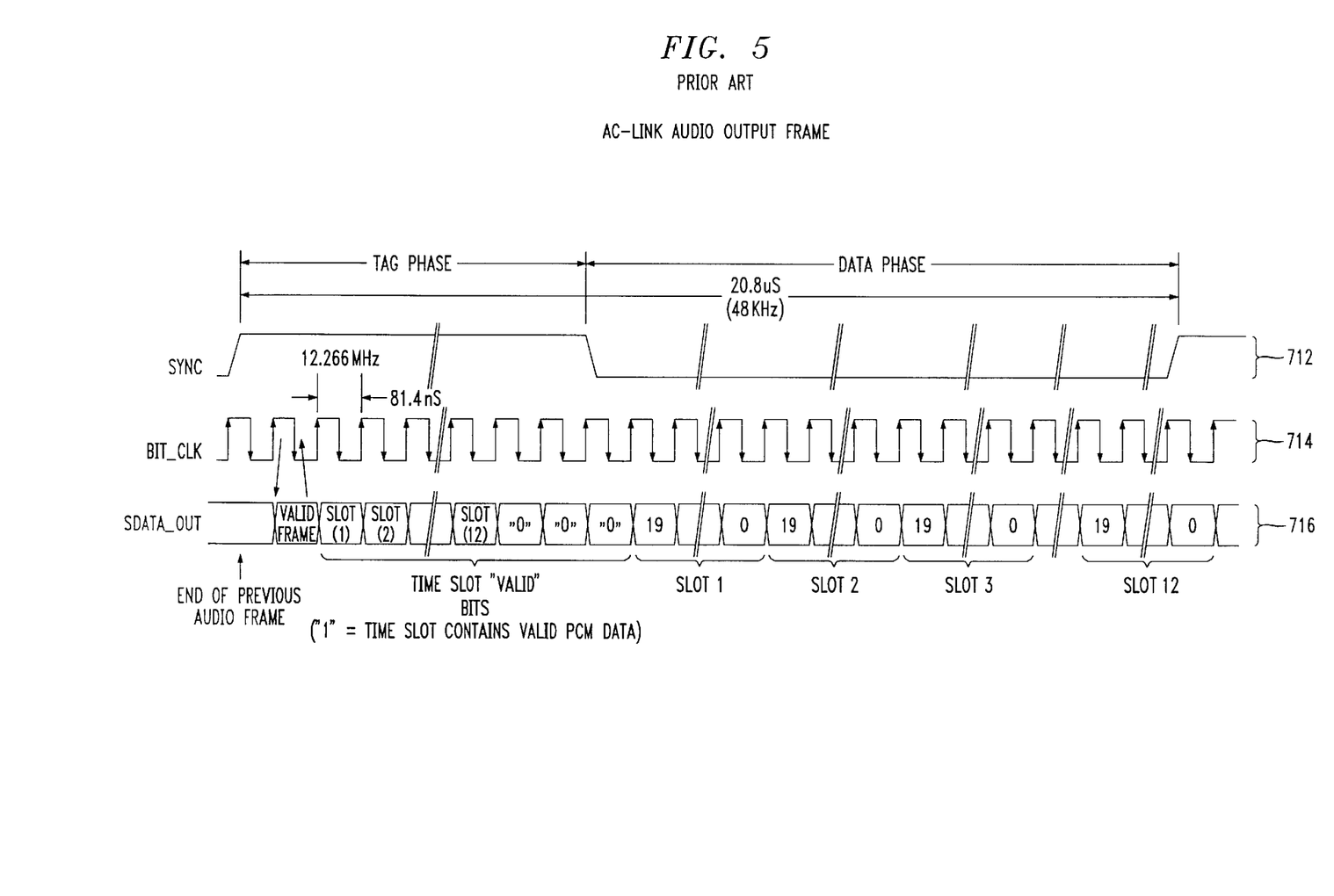
FIG. 5 shows in greater detail an implementation of a bit clock signal and serial TDM data stream with reference to the sync signal used with the serial interface shown in FIG. 3.

In particular, FIG. 5 shows the clock signal BIT_CLK 714 and serial TDM data stream SDATA_OUT 716 with reference to the sync signal 712. The sync signal 712 is based on the clock signal BIT_CLK 714, which is a fixed 12.288 MHz clock signal.

Figure 6:
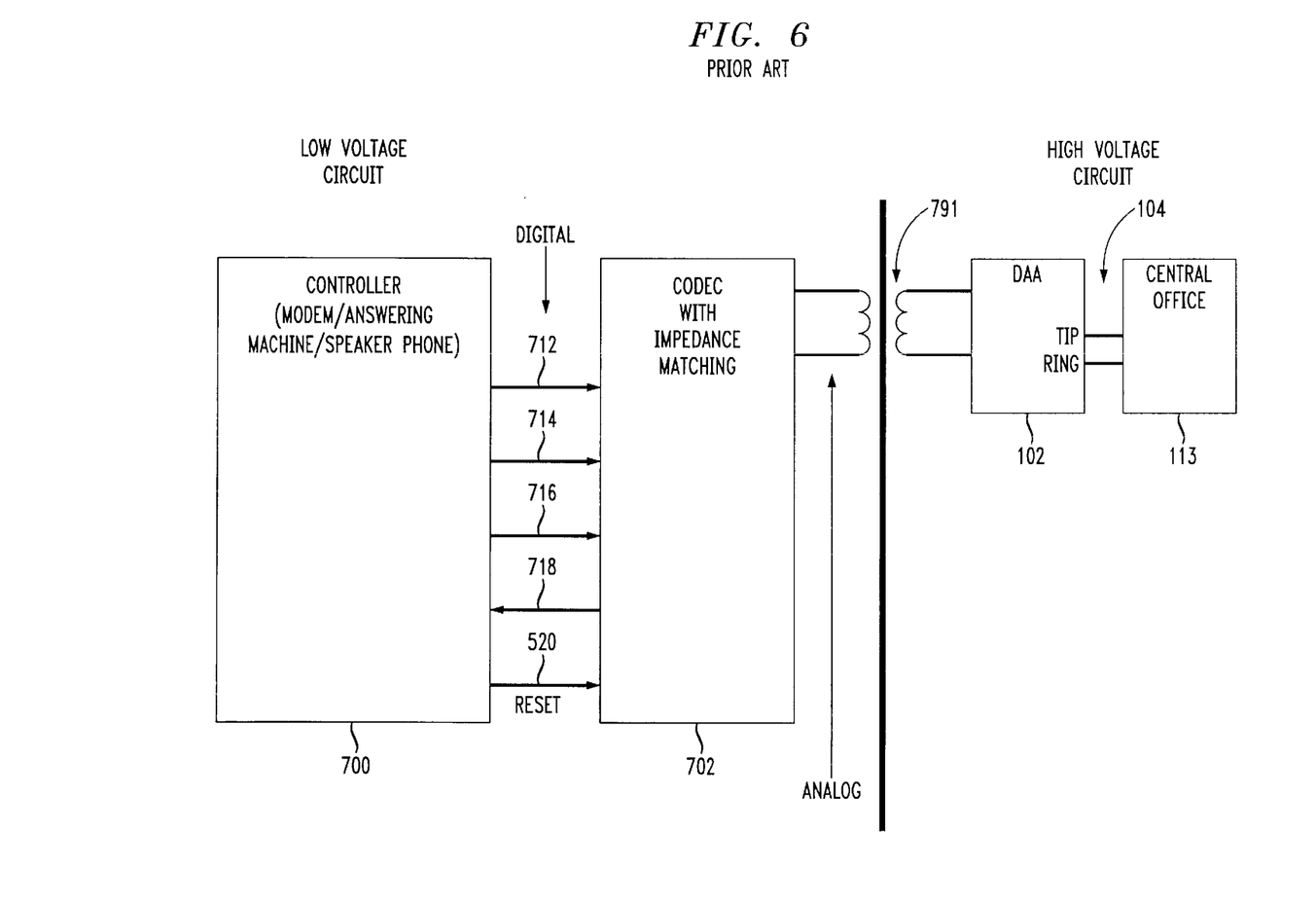
FIG. 6 shows a conventional transformer isolation circuit.

FIG. 6 shows an implementation of the AC analog sub-system (i.e., codec) 702 interfaced with the controller 700 on a low voltage circuit side using a conventional differential implementation of the serial interface. As shown, the codec 702 is typically exposed to voltages in excess of the power voltage, and therefore is referred to herein as a high voltage circuit. In some situations it is desirable to AC couple a clock signal in a serial interface such that a codec or other high voltage circuit 702 may be electrically isolated from the ground of a low voltage circuit 700. It would similarly be desirable to AC couple the transmit data signal 716, the receive data signal 718, the frame sync signal 712, and the reset signal 520. If all signals between the low voltage controller 700 and the high voltage codec 702 are AC coupled, then there is essentially no need for a connection to exist between the ground of the low voltage controller 700 and the ground of the high voltage codec 702.

Unfortunately, in practical situations, once the grounds between the low voltage controller 700 and high voltage codec 702 are broken, a large common mode voltage may exist between the ground potential of the low voltage controller 700 and the ground potential of the high voltage codec 702. This large common mode voltage may interfere with the AC coupled digital signals in the isolated high voltage codec 702. Moreover, the cost of an isolating transformer 791 can be significant, and if the codec 702 is to perform impedance emulation with a central office, the transformer 791 can degrade impedance matching between the codec 702 and the telephone line.

Figure 7:
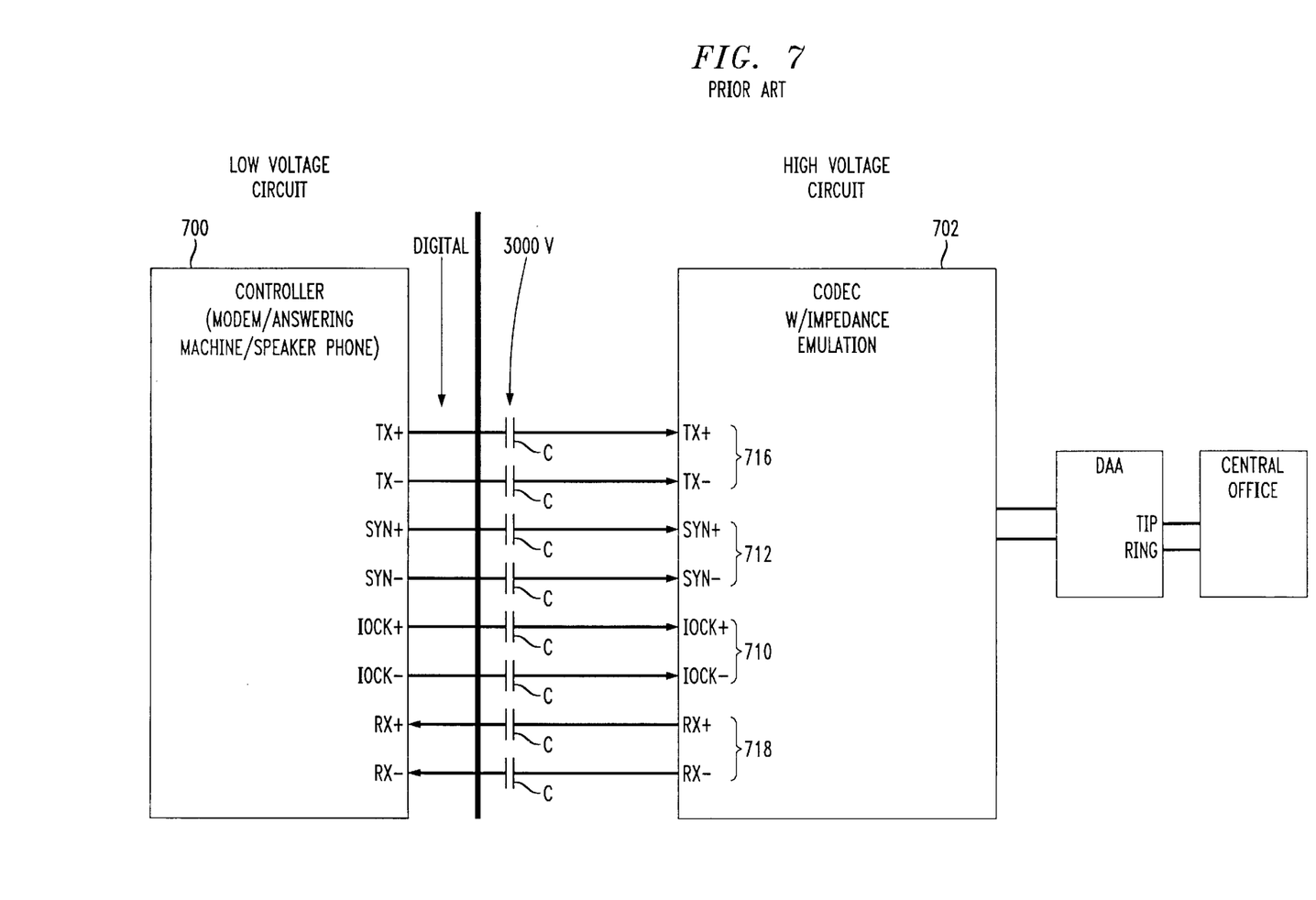
FIG. 7 shows a conventional digital AC coupling capacitor isolation circuit.

Thus, an alternative implementation of the serial interface has been developed wherein the codec (which may be connected to a telephone line, modem, audio source, etc.) is placed in the high voltage section of the system as shown in FIG. 7 to eliminate the expensive and large transformer 791 which is otherwise traditionally used to couple the low voltage side to the high voltage side. This technique eliminates the need for the transformer 791, but is disadvantageous for other reasons, e.g., because it requires additional hardware such as the AC coupling capacitors C (typically rated at 3000 V AC).

An example of such a serial interface could be used with a LUCENT TECHNOLOGIES CSP1034 multi-processor mode SIO interface. In such an example, five serial lines are typically needed to provide the interface, and each of the five signals corresponding to the five serial lines would need to be converted to differential signal pairs. Each of the five signal pairs would each need to be isolated with a corresponding pair of capacitors for voltage isolation, requiring a total of ten (10) high voltage capacitors.

It is important to reduce the number of communication lines necessary to interface between circuits, particularly where one of the circuits is subject to higher voltages, e.g., a codec, because of the relative cost of the hardware and space required for each of the individual lines. Thus, there is a need for reducing the number of signal lines in a synchronous serial interface such as the time division multiplex (TDM) serial interface of the AC '97 specification.

SUMMARY OF THE INVENTION

In accordance with the principles of the present invention, a synchronizing data protocol for use in occasionally synchronizing timing between a master device and a slave device comprises a preamble insertion module in the master timing device adapted to insert a preamble code word into a data stream for transmission to the slave device. A synchronizing preamble detection module in the slave device is adapted to detect a presence of the preamble code word in the data stream.

A method of synchronizing a slave device to a master device over a serial data bus in accordance with another aspect of the present invention comprises providing an interrupt signal to the slave device. The data stream received by the slave device is monitored for a presence of a synchronizing preamble code word. A timing in the slave device is based on a timing of a detection of the synchronizing preamble code word by the slave device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a synchronizing data protocol comprising one or more serial input-output (SIO) control word(s) and data passed across a high voltage interface, which eliminates the need for a frame synchronization signal.

The traditional method of passing codec data across a high voltage interface was shown and described with respect to FIG. 6, i.e., by placing a codec 702 on the low voltage side of an interface and passing analog signals across the high voltage barrier with high voltage isolation (e.g., 3000 volt isolation) provided by a transformer 791. The transformer 791 would also isolate the codec 702 from low frequency common mode noise, e.g., riding on the twisted pair wiring of a telephone line 104. In addition, the transformer 791 would isolate the telephone system of a central office 113 from high frequency common mode noise generated by the digital subsystems in the controller 700 and codec 702. However, the use of a transformer 791 makes impedance matching by the codec 702 with the central office 113 more difficult due to amplitude and phase distortion introduced by the transformer 791.

Alternatively, to eliminate the need for the transformer 791, the codec 702 may be placed on the high voltage circuit side as shown in FIG. 7. In this case, the codec 702 is AC coupled to the differential digital SIO signals 712, 714, 716, 718 and 520. Using this technique, the differential receivers pass digital signals and reject the majority of common mode noise, and the combination of high voltage capacitors C and differential receivers replace the functions otherwise provided by the transformer 791 (FIG. 6).

The principles of the present invention further the conventional technique shown in FIG. 7 by eliminating the need for the sync signal 712. Elimination of the sync signal 712 saves two pins on each of the controller 700 and the codec 702, eliminates required board space, and reduces overall system cost, e.g., by eliminating two expensive AC coupling capacitors C.

Figure 1:
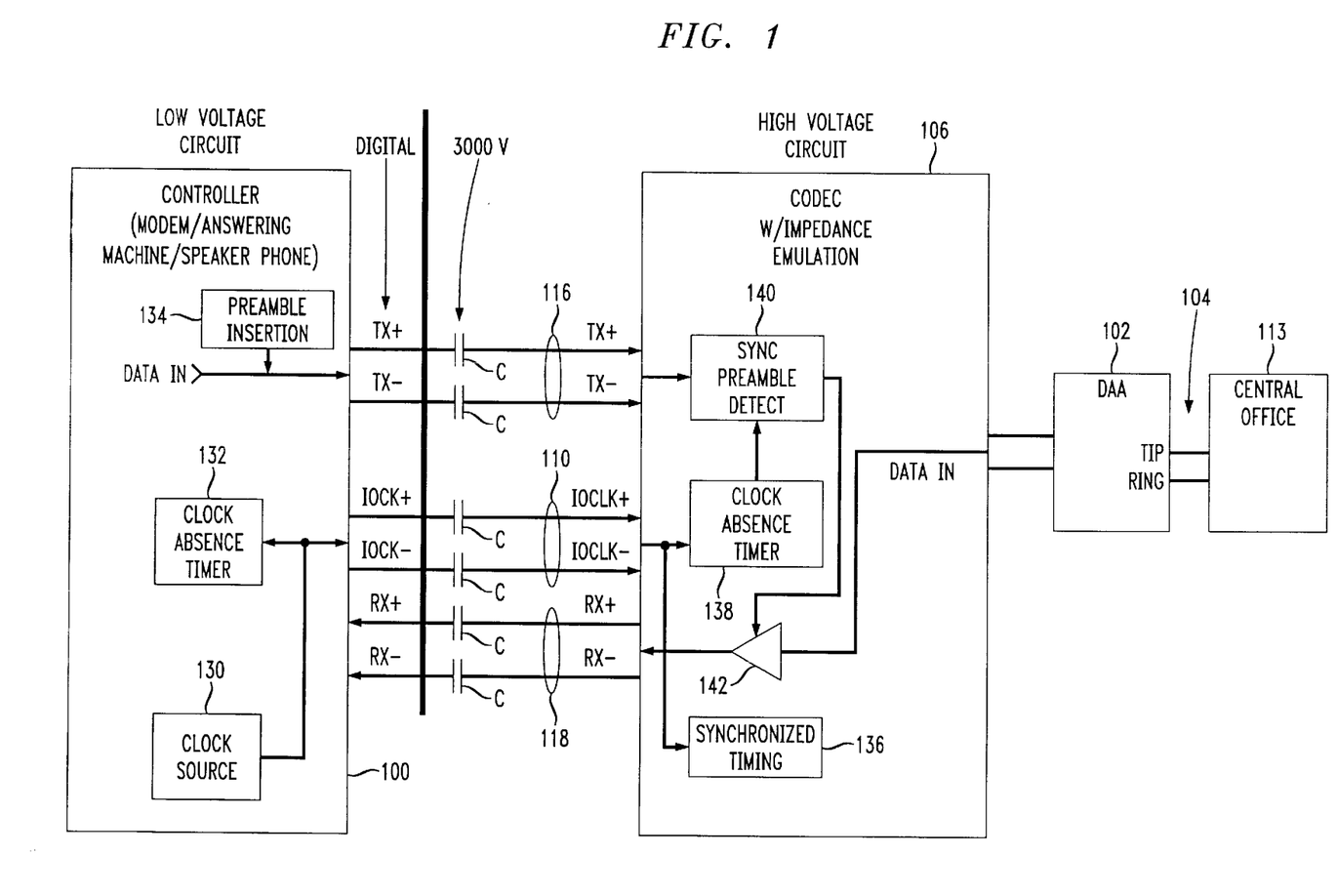
FIG. 1 shows an exemplary synchronizing data protocol used without the need for frame synchronization, in accordance with the principles of the present invention.

In accordance with the disclosed embodiment of the present invention shown in FIG. 1, elimination of the conventional sync signals 712 is accomplished by adding circuitry or software on one side of the interface, e.g., on the low voltage side, to insert a predetermined synchronizing code word into a data stream and, on the high voltage side, to recognize the presence of the predetermined synchronizing code word. While the described embodiment relates to a synchronization controlled by the device on the low voltage side, with the device on the high voltage side synchronizing to the clocking of the device on the low voltage side, the principles of the present invention relate to synchronization controlled by either the device on the low voltage side (e.g., the controller 100) or the device on the high voltage side (e.g., the codec 106).

Moreover, while the disclosed embodiments relate to a controller and audio codec communicating over an AC link in general conformance with the AC '97 Specification, the principles of the present invention relate equally to any serial communication link otherwise requiring a synchronization pulse such as a framing pulse, e.g., in a synchronous serial data stream or in a time division multiplexed (TDM) synchronous serial data stream communication system.

In accordance with the disclosed embodiment, a data protocol is implemented which replaces the need for a frame synchronization signal. The data protocol is particularly useful with very stable TDM communication lines.

In the disclosed embodiment, 1-bit sigma delta data is transferred between a controller and an audio codec. A data protocol is implemented over the data line which provides occasional synchronizing between the data being transmitted by a transmitting system (e.g., the codec 106 in FIG. 1) and the data being received by a receiving system (e.g., the controller 100 in FIG. 1).

The principles of the present invention are further applicable to implementations which further reduce the required signals between digital components, e.g., between the controller 100 and the codec 106. For instance, the required number of signals and corresponding AC coupling capacitors may be further reduced by combining a synchronizing data protocol in accordance with the principles of the present invention with a signal encoding the transmit signals and data clock together using bi-phase encoding, as described in U.S. application Ser. No. 09/013,943 entitled "Method and Apparatus For Combining Serial Data With A Clock Signal" filed Jan. 27, 1998, the specification of which is expressly incorporated herein by reference in its entirety.

FIG. 1 shows an embodiment of a serial TDM interface forming the basis of an AC Link in accordance with the AC '97 Specification. However, in FIG. 1, the otherwise conventional frame synchronization signal (e.g., 712 in FIG. 7) is eliminated and replaced by a synchronizing data protocol in the controller 100 in accordance with the eprinciples of the present invention.

In particular, FIG. 1 shows implementation of a codec 106 on a high voltage circuit side, and a controller 100 on a low voltage circuit side. In the disclosed embodiment, the codec 106 is interfaced with a DAA 102, which in turn is connected through a telephone line 104 to a telephone company central office 113. However, in accordance with the principles of the present invention and the AC '97 Specification, the codec 106 may be interfaced with virtually any analog device, particularly those related to consumer audio and telephonic devices.

The serial interface between the controller 100 and the codec 106 comprises three basic communication signals, i.e., a data transmit TDM signal 116, a data receive TDM signal 118, and a data clock signal 110. If desired, a reset signal (not shown) may also be implemented based on the needs of the particular application.

In the disclosed embodiment, the transmit signal 116, the receive signal 118, and the clock signal 110 are each differential signals including at least one AC coupling capacitor C in each side of the respective differential signal line. However, the principles of the present invention are equally applicable to single-ended serial lines. Moreover, the transmit signal 116 and the clock signal 110 may be combined into a single encoded signal as described in U.S. application Ser. No. 09/013,943, the specification of which is explicitly incorporated herein by reference.

The low voltage circuit, i.e., the controller 100 includes a preamble insertion module 134, a clock absence timer 132, and a clock source 130. The high voltage circuit, i.e., the codec 106, includes a sync preamble detect module 140, a clock absence timer 138, a synchronized timing module 136, and a buffer 142 which is activated upon detection of the preamble code word in the data stream following an absence of the clock signal.

In particular, the preamble insertion module 134 is adapted to insert a predetermined, preamble code word, e.g., '11101', into a data stream transmitted on the transmit signal line 116. Depending upon the particular application, the preamble code word may be any code and may be of any length. Preferably, the preamble code word is at least five bits long, and preferably starts with a '111'.

The preamble code word is inserted into the data stream following an absence of the clock signal. Thus, to initiate a resynchronization, the controller 100 intentionally halts the clock source 130 for a predetermined period of time, e.g., for at least 700 mS, then inserts the preamble code word into the transmit data stream 116.

The clock absence timer 132 in the controller 100 relates to a self-monitoring function by the controller 100 to determine how long the controller 100 has halted a clock source 130 from being output on the clock signal line 110. After a sufficient amount of time that the clock is withheld from the codec 106, e.g., after 700 mS, the preamble insertion module 134 inserts the preamble code word into an appropriate time slot of the data stream being transmitted on the transmit signal line 116.

The controller 100 is a master and the codec 106 is a slave with respect to the timing of the serial TDM interface. Thus, in the codec, timing is received and synchronized by the synchronized timing module 136. The clock signal is also monitored by the clock absence timer 138. The clock absence timer 138 activates the sync preamble detect function 140 upon detection of the absence of the clock signal for more than a threshold amount of time, e.g., for more than 700 mS. Upon activation, the sync preamble detect function 140 monitors the data stream received on the transmit line 116 for the presence of the predetermined preamble code word.

The present inventors realized the stability of TDM serial interfaces in general, and the AC link in particular, in development of the present invention. For instance, it was empirically determined that a typical bit error rate (BER) of data passing over a conventional transmit signal line 716 (FIG. 7) was on the order of less than 1 bit error every ten (10) years. Thus, it was determined, with such stability in the serial TDM data communications that frame synchronization need not occur every frame to maintain such stability. It was determined that an occasional synchronization carried out through the recognition of a unique data protocol would provide adequate synchronization to maintain an extremely stable communication link (i.e., having a low bit rate), while at the same time would eliminate the cost and space required for the additional synchronization signal (e.g., 712 in the conventional interface shown in FIG. 7). In accordance with the principles of the present invention, after synchronization, the data communications would be allowed to free run using only the transmit signal 116, the receive signal 118, and the clock signal 110.

Figure 2:
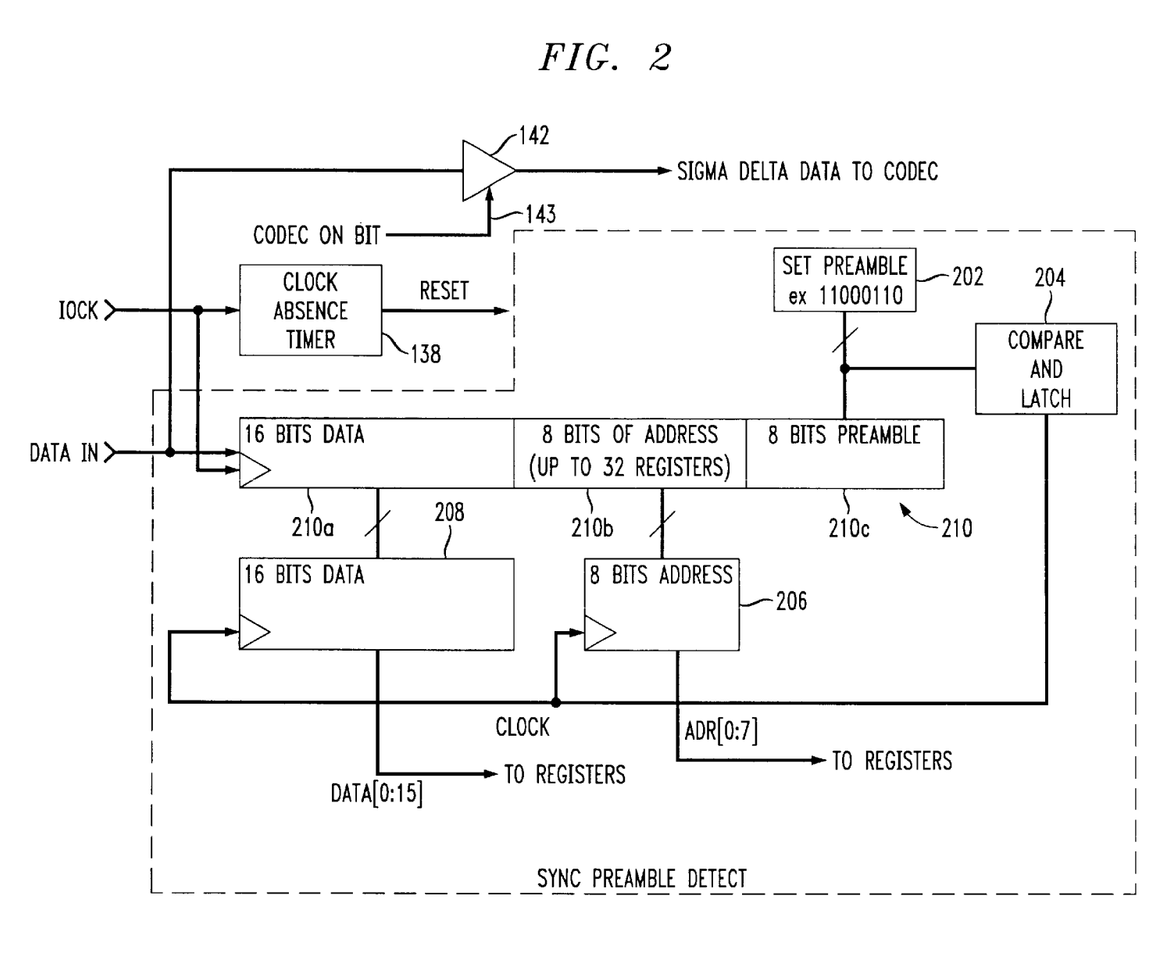
FIG. 2 is a more detailed diagram of the synchronizing data protocol shown in FIG. 1.

FIG. 2 shows an embodiment of the sync preamble detect function 140 wherein control information may be passed from the controller 100 to the codec 106 together with the preamble code word.

In particular, a data stream buffer 210 may be parsed apart to determine the presence of the preamble code word together with address and/or data information. The preamble code word 202 may be, e.g., an 8-bit code word such as '11000110', and may be received in a first buffer 210c. A second buffer 210b may receive address information, e.g., up to 256 registers each containing an 8-bit address. Similarly, general data information, e.g., 16-bit data words, may be received in a third buffer 210a.

Upon recognition of the preamble code word 202, a comparator and latch controller 204 may clock the data contained in the data buffer 210a into an appropriate register 208, and the address(es) contained in the address buffer 210b into appropriate registers(s) 206. The data and address information latched into the registers 206, 208 may relate to system parameters typically initiated at system startup or at timing synchronization.

To distinguish control words from signal data, an interrupt procedure may be set up to eliminate the need for an interrupt line. In the disclosed embodiment, this interrupt procedure is triggered by the absence of the clock signal as detected by the clock absence timer 138. When the clock stops for at least a predetermined length of time, the sync preamble detect function 140 is reset to thus monitor for the presence of the preamble code word 202. Once the preamble code word 202 is detected, the data and address will be latched into the appropriate registers 206, 208. The data and address registers 206, 208 will not accept new data until another interrupt is received, i.e., until the clock stops and starts again.

Once all of the desired registers are all programmed, a bit 143 is set to enable the buffer 142 enabling data, e.g., sigma delta data transfer to the codec. As long as the clock signal continues to be present at the codec 106, data is transferred to the codec filters.

Thus, in accordance with the principles of the present invention, the synchronizing data protocol need only be transmitted once in certain applications, at the beginning of a communication transaction. However, as dictated by the particular application, it may be desirable to occasionally activate the synchronizing data protocol to further ensure reliable and error free communications. For instance, upon detection of an absence of a clock signal received by the codec 106 of at least a minimum amount of time, e.g., an absence of a clock signal for greater than 25 microseconds ($\mu S$), a warm synchronization may be activated wherein it is likely that stored registers and other memory resident parameters remain stable. In such a warm synchronization, the preamble is inserted into the data stream by the preamble insertion module 134 in the controller 100, the preamble is detected by the sync preamble detector 140 in the codec 106, and data communications proceed therefrom.

Moreover, in another embodiment, a loss of powering current from a telephone line may be sensed. In certain countries, current available on a telephone line may routinely be interrupted for up to 700 milliseconds (mS), thus circuitry being powered by line current must accommodate for such gaps in powering current. However, in the event of an out-of-specification current interruption of greater than 700 mS, the codec 106 and other circuitry (if being powered by the telephone line 104) may experience an unpredictable period without power. In such a case, upon recovery from the current loss, a synchronizing data protocol in accordance with the principles of the present invention may be implemented to re-synchronize communications.

In testing, replacement of a synchronizing signal with a synchronizing data protocol in accordance with the principles of the present invention has proved very reliable, even with communication lines which exhibit a large amount of noise.

The principles of the present invention have applicability with synchronous serial data streams in general, and not just with time division multiplexed serial data streams. For instance, the invention may be implemented with a continuous synchronous serial transmission data stream otherwise conventionally utilizing a framing signal or other signal to synchronize a receiving device with the serial data transmission.

Moreover, while the present invention is described with reference to a specific codec, i.e., an AC '97 conforming codec, the principles of the present invention relate to communication with any codec device.

While the invention has been described with reference to the exemplary preferred embodiments thereof, those skilled in the art will be able to make various modifications to the described embodiments of the invention without departing from the true spirit and scope of the invention.

We claim:

1. A synchronizing data protocol for use in synchronizing timing between a master device and a codec, comprising:
   a preamble insertion module in said master timing device adapted to insert a preamble code word, synchronizing timing between said master device and said codec, into selected frames in a data stream for transmission to said codec; and
   a synchronizing preamble detection module in said codec device adapted to detect a presence of said preamble code word in said data stream;
   wherein said preamble code word is inserted into said selected frames only when said master device and said codec are either initially synchronized or need to be re-synchronized.

2. The synchronizing data protocol for use in synchronizing timing between a master device and a codec according to claim 1, wherein:
   said selected frames are non-contiguous.

3. The synchronizing data protocol for use in synchronizing timing between a master device and a codec according to claim 1, wherein:
   a timing in said codec is synchronized based on a timing of a detection of said preamble code word in said data stream.

4. The synchronizing data protocol for use in synchronizing timing between a master device and a codec according to claim 1, further comprising:
   control address and data information adapted for transmission with said preamble code word, said control address and data information relating to system parameters in said codec.

5. The synchronizing data protocol for use in synchronizing timing between a master device and a codec according to claim 1, further comprising:
   an interrupt module having an operation based on an alteration of a clock signal from said master device to said codec.

6. The synchronizing data protocol for use in synchronizing timing between a master device and a codec according to claim 5, wherein said interrupt module comprises:
   a first clock absence timer in said codec adapted to detect an absence of said clock signal for at least a predetermined length of time.

7. The synchronizing data protocol for use in synchronizing timing between a master device and a codec according to claim 6, wherein said interrupt module further comprises:
   a second clock absence timer in said master device to provide an indication of said predetermined length of time to said master device.

8. The synchronizing data protocol for use in synchronizing timing between a master device and a codec according to claim 5, wherein:

said alteration of said clock signal is a non-changing clock signal for at least a predetermined length of time.

9. The synchronizing data protocol for use in synchronizing timing between a master device and a codec according to claim 1, further comprising:

a buffer in said codec adapted to be enabled upon detection of said preamble code word.

10. A method of synchronizing a codec to a serial data bus, said method comprising:

providing an interrupt signal to said codec;

monitoring a data stream received by said codec for a presence of a synchronizing preamble code word; and basing a timing in said codec on a timing of a detection of said synchronizing preamble code word by said codec;

wherein said synchronizing preamble code word is used only when said codec device and said serial data bus are either initially synchronized or need to be re-synchronized.

11. The method of synchronizing a codec to a master device over a serial data bus according to claim 10, wherein said providing step comprises:

halting a transmission of a clock signal over said serial data bus for at least a predetermined length of time.

12. The method of synchronizing a coder to a master device over a serial data bus according to claim 10, wherein:

said synchronizing is performed occasionally with respect to a frame signal.

13. The method of synchronizing a codec to a master device over a serial data bus according to claim 11, wherein:

said predetermined length of time is at least 25 microseconds.

14. Apparatus for synchronizing a codec to a master device over a serial data bus, said method comprising:

means for providing an interrupt signal to said codec;

means for monitoring a data stream received by said codec for a presence of a synchronizing preamble code word; and means for basing a timing in said codec on a timing of a detection of said synchronizing preamble code word by said codec;

wherein said synchronizing preamble code word is used only when said codec device and said serial data bus are initially synchronized or need to be re-synchronized.

15. The apparatus for synchronizing a codec to a master device over a serial data bus according to claim 14, wherein said means for providing said interrupt signal comprises:

means for halting transmission of a clock signal over said serial data bus for at least a predetermined length of time.

16. The apparatus for synchronizing a codec to a master device over a serial data bus according to claim 14, wherein:

said synchronizing is performed occasionally with respect to a frame signal.

17. The apparatus for synchronizing a codec to a master device over a serial data bus according to claim 15, wherein:

said predetermined length of time is at least 25 microseconds.

* * * * *